US008550009B2

(12) United States Patent
Geraud et al.

(10) Patent No.: US 8,550,009 B2
(45) Date of Patent: Oct. 8, 2013

(54) DIESEL-ELECTRIC LOCOMOTIVE

(75) Inventors: Sebastien Christian Geraud, Belfort (FR); Pierre Chanal, Grandvillars (FR)

(73) Assignee: Alstom Transport SA, Levallois-Perret (FR)

( * ) Notice: Subject to any disclaimer, the term of this patent is extended or adjusted under 35 U.S.C. 154(b) by 52 days.

(21) Appl. No.: 13/210,661

(22) Filed: Aug. 16, 2011

(65) Prior Publication Data

US 2012/0073467 A1    Mar. 29, 2012

(30) Foreign Application Priority Data

Aug. 16, 2010    (FR) ..................................... 10 56611

(51) Int. Cl.
*B61C 3/00*    (2006.01)
(52) U.S. Cl.
USPC .............................................................. 105/35
(58) Field of Classification Search
USPC ... 105/26.05, 35, 36, 61, 62.1, 76; 180/65.21
See application file for complete search history.

(56) References Cited

U.S. PATENT DOCUMENTS

| | | | | |
|---|---|---|---|---|
| 3,701,556 A * | 10/1972 | Richmond | .................. | 290/40 B |
| 4,853,553 A * | 8/1989 | Hosie | ........................ | 290/40 C |
| 5,629,568 A * | 5/1997 | Mertens | ...................... | 290/40 R |
| 5,977,647 A * | 11/1999 | Lenz et al. | .................. | 290/40 C |
| 6,603,227 B2 * | 8/2003 | Rose, Sr. | ......................... | 310/74 |
| 6,646,360 B2 * | 11/2003 | Brown | .......................... | 307/43 |
| 7,330,012 B2 * | 2/2008 | Ahmad et al. | ................ | 318/811 |
| 7,385,372 B2 * | 6/2008 | Ahmad et al. | ................ | 318/811 |
| 8,136,454 B2 * | 3/2012 | Barbee et al. | .................. | 105/50 |
| 2005/0183623 A1 * | 8/2005 | Gritsch | ....................... | 105/26.05 |
| 2008/0121444 A1 * | 5/2008 | Bauer | ......................... | 180/65.1 |
| 2009/0045761 A1 * | 2/2009 | Fuchs et al. | ................... | 318/375 |
| 2009/0072772 A1 * | 3/2009 | Fuchs et al. | ................... | 318/375 |
| 2010/0026218 A1 * | 2/2010 | Ogino et al. | ............... | 318/400.3 |
| 2011/0062778 A1 * | 3/2011 | Holweck et al. | .............. | 307/9.1 |
| 2011/0273009 A1 * | 11/2011 | Kumar | ........................... | 307/9.1 |
| 2012/0073467 A1 * | 3/2012 | Geraud et al. | .................. | 105/35 |

FOREIGN PATENT DOCUMENTS

WO    2009/040211 A2    4/2009

* cited by examiner

*Primary Examiner* — Jason C Smith
(74) *Attorney, Agent, or Firm* — ALG Intellectual Property, LLC

(57) ABSTRACT

The diesel-electric locomotive (10) includes:
  a diesel engine (12),
  an alternator (20) mechanically coupled for driving thereof to the diesel engine (12) and connected as output to a direct current bus (26) through a rectifier (22),
  at least one electric traction motor (14) connected to the bus (26) through a traction inverter (34),
  at least one piece of auxiliary equipment (16, 18) with a power supply, powered from the diesel engine (12).
It includes, to power the or each piece of auxiliary equipment (16, 18), a chain (80) for shaping the current connected as input to the direct current bus (26).

4 Claims, 1 Drawing Sheet

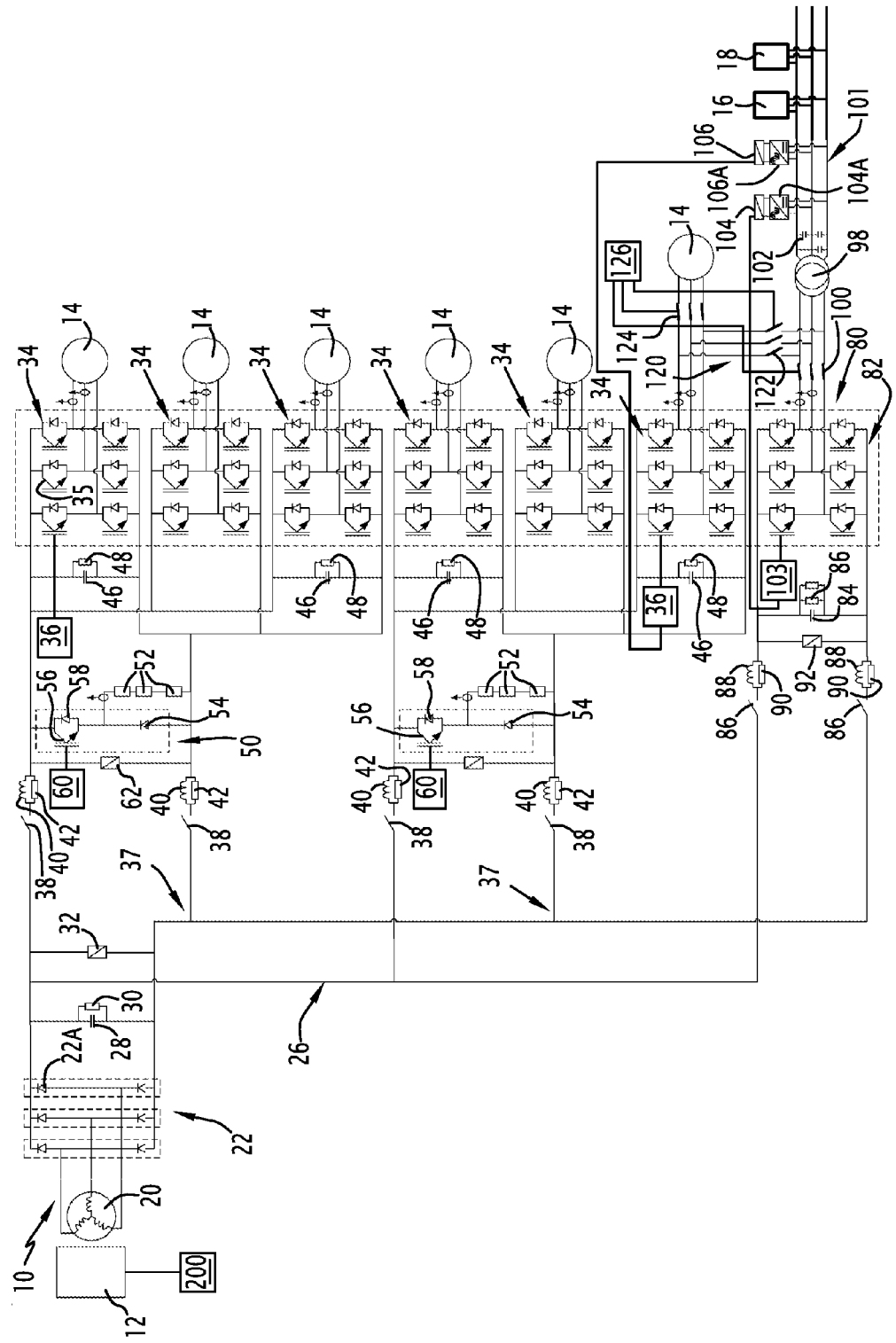

DIESEL-ELECTRIC LOCOMOTIVE

BACKGROUND

The term diesel-electric locomotive designates a locomotive the propulsion of which is ensured by several electric motors, the electrical energy powering the motors being provided by a diesel engine supplied with heavy fuel oil and driving an alternator.

In such locomotives, the alternator powers, through a rectifier, a direct current bus to which the different electric traction motors of the locomotive are connected via inverters.

The locomotive also includes auxiliary equipment, such as cooling fans or compressors that, depending on the case, are either directly mechanically connected to the shaft of the diesel engine, or powered by an alternator specific to them, said alternator being driven by the diesel engine.

In both cases, the operating speed of the auxiliary equipment is directly connected to the speed of rotation of the diesel engine.

As a result, to allow a satisfactory operation of this auxiliary equipment during electric braking operating phases of the locomotive or stopping thereof, it is necessary to keep the diesel engine at a high enough rating. This leads to significant heavy fuel oil consumption to power the locomotive.

SUMMARY

The present invention relates to a diesel-electric locomotive of the type including:
- a diesel engine,
- an alternator mechanically coupled for driving thereof to the diesel engine and connected as output to a direct current bus through a rectifier,
- at least one piece of electric traction motor connected to the bus through a traction inverter,
- at least one auxiliary equipment with a power supply, powered from the diesel engine.

BRIEF DESCRIPTION OF THE DRAWINGS

The sole FIGURE included herein represents a diagrammatic view of the electrical circuit of a diesel-electric locomotive according to the invention.

DETAILED DESCRIPTION OF EXEMPLARY EMBODIMENTS

The invention aims at proposing a diesel-electric locomotive making it possible to reduce fuel oil consumption.

To that end, the invention relates to a diesel-electric locomotive of the aforementioned type, characterized in that it includes, to power the or each piece of auxiliary equipment, a chain for shaping the current connected as input to the direct current bus.

According to specific embodiments, the locomotive includes one or more of the following features:
- the chain for shaping the current includes an auxiliary inverter the output of which is connected to the input of a step-up transformer;
- the locomotive includes a back-up switching means able to selectively connect the chain for shaping the current to the output of a traction inverter and the traction inverter includes a pilot means to ensure production of a current identical to that normally produced by the auxiliary inverter;
- the back-up switching means is able to connect the input of the step-up transformer to the output of the traction inverter;
- the locomotive includes a switching means able to ensure the disconnection of the auxiliary inverter from the input of the step-up transformer when the step-up transformer is connected to the traction inverter through the back-up switching means; and
- the locomotive includes at least one rheostatic braking chopper arranged between the direct current bus and the or each traction inverter.

The invention will be better understood upon reading the following description, provided solely as an example and done in reference to the sole FIGURE, which is a diagrammatic view of the electrical circuit of a diesel-electric locomotive according to the invention.

The diesel-electric locomotive 10 diagrammed in the FIGURE includes, as known in itself, a diesel engine 12 powered by heavy fuel oil and electric traction motors 14, here six.

Furthermore, the locomotive includes auxiliary equipment such as, for example, a fan 16 and a compressor 18.

The output shaft of the engine 12 is mechanically connected to an alternator 20 able to produce a three-phase current powering a rectifier 22 made up of a diode bridge 22A. The two outputs of the diode bridge supply, in direct current, a bus 26 the voltage of which varies from 600V to 1800V as a function of the speed of rotation of the diesel engine 12.

A smoothing capacitor 28 with a discharge resistance 30 mounted in parallel is provided between the two output terminals of the rectifier 22, as well as a sensor 32 for measuring the voltage at the terminals of the direct bus 26.

The traction motors 14 are each powered by a respective IGBT traction inverter 34. Each inverter 34 is made up of three branches, each formed by two one-way switches 35 connected serially. These three branches are connected to the two direct inputs of the inverter. The three outputs for the three-phase current of the inverter are taken between the two one-way switches 35 of each branch.

Each one-way switch is formed, as known in itself, by an IGBT transistor and a diode mounted in anti-parallel.

Each inverter 34 is equipped with a control unit 36 able to control the one-way switches 35, for example following a pulse width modulation law so as to power the associated traction motor 14 so that it supplies the required power. To unclutter the drawing, only certain control units 36 are illustrated.

The inputs of the traction inverters 34 are connected in parallel by threes to the direct bus 26 via two power branches 37 provided with two sectioning switches 38, each mounted serially with a decoupling inductor 40, which in turn is mounted in parallel with a resistance 42.

Two capacitors 46 are provided at the input of the traction inverters 34 of a same group of motors.

Moreover, for each group of motors, a rheostatic chopper 50 able to ensure electric braking is provided between the two branches 37 of the power supply grid.

As known in itself, each chopper 50 includes, between the two power branches 37, a set of discharge resistances 52 mounted in parallel with a diode 54, and serially connected with a one-way switch 56. This one-way switch is formed by an IGBT transistor mounted in anti-parallel with a diode.

The IGBT transistor is connected to a control circuit 60 able to apply a control law making it possible to control the energy dissipated in the resistances 52 during braking of the locomotive, the inverters 34 then being piloted from the units 36 to receive electrical energy from the traction motors 14.

A voltage sensor 62 is provided between the two power branches 36.

The auxiliary equipment 16, 18 is connected through a power chain 80 directly to the direct bus 26. This chain includes a static converter 82 formed by an auxiliary IGBT inverter identical to the traction inverters 34 including, as before, a charge capacitor 84 connected in parallel with a discharge resistance 86.

Two sectioning switches 86 connect the inverter to the direct bus 26 through a decoupling inductor 88 mounted in parallel with a resistance 90. A voltage sensor 92 is provided at the input of the inverter 82.

The output of the inverter 82 is connected to a three-phase step-up transformer 98 through a three-phase contactor 100. The step-up transformer 98 has a transformation ratio greater than 1 and in particular between 1 and 3.

The step-up transformer 98 powers, as output, a three-phase power supply grid 101 of the industrial type, for example having an effective voltage of 480 V and a frequency of 60 Hz.

Three trimmer capacitors 102 are arranged between the phases of the power bus 101 as output of the transformer.

The IGBT transistors of the inverter 82 are piloted by a control circuit 103 able to ensure a voltage equal to 480V and 60 Hz on the three-phase power supply grid of the auxiliary loads. The power bus 101 is equipped with two direct voltage sensors 104, 106 connected to the bus by two diode rectifier bridges 104A, 106A.

The sensor 104 is connected to the control circuit 103 and the latter ensures the piloting of the transistors from the measured voltage to ensure regulation.

The presence of the step-up transformer 98 makes it possible to reach such a voltage, even when the engine 12 idles and the voltage on the direct bus is equal to 600 V.

A bypass 120 ensures the connection between the output of a traction inverter 34 for powering a traction motor 14 and the input of the step-up transformer 98. This bypass is equipped with a controllable back-up three-phase contactor 122. Likewise, three controllable switches 124 are provided between the considered traction motor 14 and the bypass 120.

The switches 100, 122 and 124 are controlled by a pilot unit 126 so that the switches 100 and 124 are in a same state and the switches 100, 124 on the one hand, and 122 on the other hand, are in opposite states, so that the output of the traction inverter 34 is only connected to one of the transformer 98 and the traction motor 14 and the inverters 82 and 34 are never located on the same three-phase grid.

The unit 126 is connected to the control unit 36 of the inverter 34 so that, when the output of the traction inverter 34 is connected to the step-up transformer 98, the control unit 36 of the inverter applies a control law adapted to obtain, on the grid 101, a voltage of 480 V under a frequency of 60 Hz. To that end, the sensor 106 is connected to the control unit 36 so that the latter regulates the voltage on the bus 101 by controlling the transistors by an adapted control law, i.e. a control law identical to that of the control circuit 103, if the inverters 34 and 82 are identical.

The diesel engine 12 is connected to a control unit 200, ensuring its piloting and in particular the rating of the engine as a function of the overall electrical power needs.

Thus, when the locomotive is stopped, or in braking phase, the unit 200 is able to ensure a minimal supply of fuel oil to the engine 12 so that the latter idles. The speed of rotation of the engine 12 is only increased by injecting more fuel oil under the control of the unit 200 during traction phases by the motors 14.

It will be understood that, during normal operation of the locomotive, whereas the diesel engine 12 is at full power, the electrical energy obtained as output of the rectifier 22 is used both to power the motors 14 and the auxiliary loads 16, 18.

During stop or overrun phases of the locomotive, when the engine 12 is kept idling, the electrical energy provided by the engine 12 is sufficient to power the auxiliary loads 16, 18, which are powered with a voltage and a constant frequency of 480V/60 Hz, independently of the engine's speed of rotation owing to the use of the static converter 82 and the step-up transformer 98.

When the vehicle travels, and it is in a braking phase, the rheostatic choppers 50 are implemented to dissipate the energy reintroduced by the motors 14 through the inverters 34.

Under these operating conditions, part of the energy reinjected by the motors 14 is used by the static converter 82 arranged in parallel with the rheostatic choppers 50 to power the auxiliary equipment 16, 18 through the step-up transformer 98 so that the engine 12 is made to idle, thereby limiting its fossil fuel consumption.

All of these operating modes make it possible to improve the fossil fuel consumption, reducing it by 3 to 4.5% depending on the operating cycle. In particular, it is reduced by 3.2% for an AAR (American Association of Railroad) cycle.

The presence of the groups of switches 100, 122, 124 and the bypass 120 makes it possible, in the event of a malfunction of the static converter 82, to ensure the power supply of the auxiliary equipment 16, 18 via a traction inverter 34, thereby allowing the locomotive to complete its mission, even if the motor 14 normally powered by the inverter 34 that then powers the auxiliary equipment is no longer in operation.

The invention claimed is:

1. A diesel-electric locomotive comprising:
   a diesel engine,
   an alternator driven by the diesel engine, wherein the output of the alternator is connected to a direct-current bus through a rectifier,
   at least one electric traction motor connected to the direct-current bus through a traction inverter,
   at least one piece of auxiliary equipment the input of which is connected to the direct-current bus through a power chain for shaping current, the power chain for shaping current comprising:
      an auxiliary inverter the output of which is connected to the input of a step-up transformer;
      the traction inverter;
      the step-up transformer;
      a back-up switch that selectively connects the step-up transformer to the direct-current bus through either the auxiliary inverter or the output of the traction inverter, wherein the traction inverter is configured to produce a current identical to that produced normally by the auxiliary inverter.

2. The diesel-electric locomotive according to claim 1, wherein the back-up switch connects the piece of auxiliary equipment to the direct-current bus through the traction inverter via the step-up transformer.

3. The diesel-electric locomotive according to claim 2, further comprising a disconnecting switch that disconnects the auxiliary inverter from the step-up transformer when the step-up transformer is connected to the traction inverter through the back-up switch.

4. The diesel-electric locomotive according to any one of the preceding claims, further comprising at least one rheostatic braking chopper arranged between the direct-current bus and the traction inverter.

* * * * *